United States Patent Office 3,660,261
Patented May 2, 1972

3,660,261
METHOD FOR REDUCTION OF BROMINE CONTAMINATION OF CHLORINE
Edward R. Wright, Freeport, and Bobby G. Messick, Lake Jackson, Tex., assignors to The Dow Chemical Company, Midland, Mich.
No Drawing. Filed Apr. 20, 1970, Ser. No. 30,352
Int. Cl. C01d 1/06, 1/08; B01k 1/00
U.S. Cl. 204—98         7 Claims

ABSTRACT OF THE DISCLOSURE

Disclosed is a method for reducing the amount of bromine contamination in free chlorine produced by the electrolysis of brine containing chloride and bromide ions. The method involves oxidizing the bromide to bromate and maintaining the pH of the brine at a value of from 2.0 to 6.5 during the electrolysis.

BACKGROUND OF THE INVENTION

A preferred method for the production of chlorine is by the electrolysis of chloride-containing brine in a diaphram type electrolytic cell or more recently in a mercury cell. In this process the chloride is oxidized to chlorine at the anode and the cation, usually sodium, is reduced to its elemental form at the cathode. A problem arises due to the fact that chloride containing brine almost invariably contains a significant amount of bromide. During electrolysis the bromide is preferentially oxidized so that a major portion of it is converted to bromine. The elevated temperatures at which the cell is run, usually about 80° C., together with the degassing effect of the chlorine being evolved cause the bromine to leave the brine solution as a gas and mix with the chlorine gas being evolved at the anode. A chlorine product containing very low amounts of bromine is desired in some cases. For example bromine present in chlorine used to prepare ethylenedichloride for conversion into vinyl chloride is undesirable. When the ethylene dichloride is cracked in a furnace to make vinyl chloride, the presence of bromine containing compounds promotes coking in the furnace.

Accordingly, it is an object of the present invention to provide a novel method for reducing the amount of bromine present as an impurity in chlorine produced by the electrolysis of brine containing chloride and bromide.

An additional object is to provide such a method which conveniently and economically reduces the amount of bromine to acceptably low levels.

SUMMARY OF THE INVENTION

The present invention is an improvement in the method of producing free chlorine by the electrolysis of brine containing both chloride and bromide ions in an electrolytic cell and recovering the chlorine gas which is evolved at the cell anode. The improvement involves oxidizing the bromide to bromate before allowing it to enter the anolyte compartment of the cell while maintaining the pH of the brine at a value of from 2.0 to 6.5 after the oxidation of bromide to bromate. The improved process results in a substantial reduction in the amount of bromine co-produced along with the chlorine.

DETAILED DESCRIPTION

The invention involves oxidizing the bromine values of bromide containing brine to bromate before the brine enters the anode compartment of the electrolytic cell. The method is applicable both to diaphram-type and mercury cathode cells, but is more readily adapted to the mercury cell.

The manner in which bromide is oxidized to bromate is not critical although $Cl_2$ or sources of available chlorine such as NaOCl and

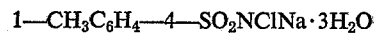

are most conveniently employed. When using a source of available chlorine as the oxidant, essentially all of the bromide in the brine is oxidized to bromate at a pH of above 5.0. At lower pH values less of the bromide is converted to bromate due to competing reactions.

After oxidation of the bromide, the brine is fed into the electrolytic cell and maintained at a pH above 2.0 and preferably above 3.0. It has been discovered that at a pH of below about 2.0 the bromate is so unstable that most of the bromine values are reduced back to bromide. Such reduction is undesirable since bromide is oxidized at the anode and evolved as elemental bromine. As the pH of the brine is raised above 2.0, the bromate becomes more stable so that bromine values pass through the cell with the liquid phase as bromate which is not reduced to free bromine at the anode, thus reducing bromine contamination of the chlorine gas.

Raising of the brine pH is limited; however, due to the fact that the cells become virtually ineffective for liberating chlorine above a pH of 6.5. The opposing benefits from rise in pH and cell efficiency result in the optimum pH value of between 3 and 5 for production of chlorine gas without substantial contamination by bromine.

When a continuous process is desired, i.e. a process in which the brine is continuously passed through the cell and a steady stream of chlorine evolved, the bromide in the brine must be converted to bromate before it enters the anode compartment. This is the case since even when the cell is operated at an acceptable pH value for oxidation of bromide to bromate, the degassing effect of chlorine evolution prevents formation of significant amounts of bromate.

The invention is further illustrated by the following examples:

EXAMPLE I

A preferred method of oxidizing bromide to bromate in chlorine cell brine is to introduce chlorine gas to the brine solution along with NaOH at a pH of greater than 5.0. The reaction is represented by the following equations:

(1)   $2NaOH + Cl_2 \rightarrow NaCl + NaOCl$

The sodium hypochlorite formed in situ reacts with bromide to form bromate in the following manner at a pH of greater than 5.

(2)   $3NaOCl + NaBr \rightarrow NaBrO_3 + 3NaCl$

At a pH of less than 5 a competing reaction takes place:

(3)   $NaOCl + 2NaBr + 2HCl \rightarrow Br_2 + 3NaCl + H_2O$ which reduces the efficiency of conversion to bromate.

In order to determine conditions under which bromide can be oxidized to stable bromate the following experiments were carried out.

Chlorine gas was bubbled through a brine solution containing 16 p.p.m. bromide and having a pH of 9.5. During 7 runs chlorine was introduced until the pH of the solution reached 5.5. One run was cut off at pH 9.0 and another allowed to run to pH 3.8. In certain runs NaOH was added to the brine. The solutions were then heated to 50° C. to expedite bromate formation. Table I summarizes the conditions under which the oxidation was carried out and the results in terms of bromate formation.

TABLE I.—CONVERTING BROMIDE TO BROMATE IN CHLORINE CELL BRINE

| Run number | pH | P.p.m. NaOH added | P.p.m. available chlorine | Mins. at 50° C. | Percent Br⁻ converted to BrO₃⁻ |
|---|---|---|---|---|---|
| 1 | 5.5 | | ¹100 | ²0 | 54 |
| 2 | 5.5 | | ¹100 | 5 | 83 |
| 3 | 5.5 | | ¹100 | 15 | 83 |
| 4 | 5.5 | 178 | 200 | 5 | 87 |
| 5 | 5.5 | 450 | 500 | 5 | 96 |
| 6 | 9.0 | 450 | 500 | 5 | 94 |
| 7 | 3.8 | 450 | 200 | 5 | 2 |

[1] Chlorinating the brine until the pH dropped to 5.5 only added 100 p.p.m. available chlorine, making it necessary to add NaOH for a greater concentration of available chlorine.
[2] Reaction was stopped as soon as 50° C. was reached.

From Table I it is seen that the addition of NaOH to increase the amount of available chlorine increases the percentage of bromide converted to bromate. Run 6 points out that the reaction goes well at pH 9.0 whereas run 7 demonstrates the lack of conversion to bromate at a pH below 5.

EXAMPLE II

Alkaline brine of pH 10 containing 25% NaCl and 16 wt. p.p.m. sodium bromide was treated with sodium hypochlorite in an amount equivalent to 0.3 wt. percent free chlorine. The pH of the solution was adjusted to 5.5 with hydrochloric acid and heated to 50° C. for five minutes at which time it was determined by analysis that 96% of the bromide had been converted to bromate. Additional bromate was added as NaBrO₃ until the brine contained a total of 30 wt. p.p.m. bromine (200 p.p.m. on 100% chlorine basis), 98% of which was present as bromate.

The pH of the brine was further reduced to 4.7 with additional HCl and placed in a typical test chlorine cell. Analysis of the chlorine product from the cell indicated that 46 wt. p.p.m. bromine was present.

EXAMPLE III

Brine was treated as in Example II except that the pH of the brine was lowered so that the chlorine test cell was operated at an anolyte pH of less than 2.0. Analysis of the chlorine product from the cell showed 379 wt. p.p.m. bromine present.

EXAMPLES IV-VI

Three additional runs were carried out in which various conditions were changed. In Example IV the oxidation step was omitted leaving all of the bromine present as bromide. Examples V and VI were run with varying percentages of the bromine being present as bromate.

Table II summarizes the results of Examples II-VI.

TABLE II.—REDUCING AN AMOUNT OF BROMINE IN CHLORINE BY CONVERTING BROMINE IN CHLORIDE CELL FEED TO BROMATE

| Example number | Brine pH | Anolyte pH | P.p.m. Br in feed [1] | | P.p.m. Br⁻ in effluent [1] | Percent conversion of Cl⁻ to Cl₂ | P.p.m. Br in Cl₂ | |
|---|---|---|---|---|---|---|---|---|
| | | | Total | Percent as bromate | | | Calc'd from Br balance | By analysis |
| II | 4.7 | 3.7 | 200 | 98 | | | | 46 |
| III | 0.5 | 1.4 | 200 | ²0 | | | | 379 |
| IV | 6 | 3.7 | 172 | 0 | 72 | 43.3 | 232 | 193 |
| V | 6 | 3.7 | 214 | 98 | 192 | 43.8 | 51 | 33 |
| VI | 6 | 2.0 | 176 | 80 | 131 | 42.6 | 105 | |

[1] P.p.m. are on 100% chlorine basis.
[2] 100% was present as bromate until the pH was adjusted to 0.5.

From the data of Table I it can be seen that at an anolyte pH of 3.7 and substantially complete conversion of bromide to bromate (Examples II and V) the amount of bromine found in the chlorine product is quite low. In Example IV, where none of the bromide was oxidized to bromate, the amount of bromine impurity in the chlorine was substantially higher. In Example VI, where 80% of the bromide was oxidized to bromate and the pH was reduced to 2.0, the amount of bromine impurity was partially reduced. Example III illustrates the necessity of maintaining the pH at a level of at least 2.0. In this run, all of the bromide had been oxidized to bromate, but the bromate was unstable at the low pH and was reduced back to bromide which was oxidized to bromine at the anode.

Examples III and IV also illustrate how the halogen product can become more concentrated in bromine than the brine from which it is obtained. This occurs because not all of the chloride is converted to chlorine whereas greater amounts of the more easily oxidized bromide is converted to bromine which appears as an impurity in the chlorine.

We claim:

1. In the method for producing free chlorine by the electrolysis of brine containing both chloride and bromide ions in an electrolytic cell and recovering the chlorine gas which is evolved at the cell anode, the improvement which comprises oxidizing the bromide ions to bromate ions at a pH above about 3.8 before the brine enters the anode compartment and maintaining the pH of the brine at a value within the range of from 2.0 to 6.5 in the anode compartment, thereby decreasing the amount of bromide ion available for oxidation to bromine and decreasing the amount of bromine impurity to the chlorine gas.

2. The method as described in claim 1 wherein the pH of the brine in the anode compartment is maintained within the range of from 3.0 to 5.0.

3. The method as defined in claim 1 wherein the bromide is oxidized by contacting it with a source of available chlorine.

4. The method of claim 3 wherein the source of available chlorine is NaOCl.

5. The method of claim 4 wherein the NaOCl is formed in situ by bubbling chlorine through a brine solution containing NaOH.

6. The method of claim 5 wherein the NaOCl is formed at a pH of greater than 5.0.

7. The method as described in claim 1 wherein the electrolysis of the brine is carried out in a mercury cell.

References Cited
UNITED STATES PATENTS

| | | | |
|---|---|---|---|
| 2,569,329 | 9/1951 | Osborne et al. | 204—98 |
| 3,446,719 | 5/1969 | Nicolaisen | 204—99 |
| 3,055,734 | 9/1962 | Pomykaca | 204—128 X |
| 3,403,083 | 9/1968 | Currey et al. | 204—128 X |

JOHN H. MACK, Primary Examiner

D. R. VALENTINE, Assistant Examiner

U.S. Cl. X.R.

204—99, 128